US005809506A

United States Patent [19]
Copeland

[11] Patent Number: 5,809,506
[45] Date of Patent: *Sep. 15, 1998

[54] METHOD FOR CREATING AN OBJECT BASE OF PERSISENT APPLICATION OBJECTS IN AN OBJECT ORIENTED PROGRAMMING ENVIRONMENT AND APPARATUS RELATED THERETO

[75] Inventor: George Prentice Copeland, Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 589,230

[22] Filed: Jan. 22, 1996

[51] Int. Cl.$^6$ ..................................................... G06F 17/30
[52] U.S. Cl. .......................... 707/103; 395/705; 395/702; 395/500; 707/6
[58] Field of Search .................................... 395/614, 705, 395/702, 500; 707/103

[56] References Cited

U.S. PATENT DOCUMENTS

| | | | |
|---|---|---|---|
| 4,525,780 | 6/1985 | Bratt et al. ................................ | 364/200 |
| 4,566,078 | 1/1986 | Crabtree .................................... | 364/900 |
| 4,814,971 | 3/1989 | Thatte ........................................ | 364/200 |
| 4,853,842 | 8/1989 | Thatte et al. ............................. | 364/200 |
| 4,989,132 | 1/1991 | Mellender et al. ...................... | 364/200 |
| 5,008,786 | 4/1991 | Thatte ........................................ | 364/200 |
| 5,016,162 | 5/1991 | Epstein et al. ........................... | 364/200 |
| 5,043,871 | 8/1991 | Nishigaki et al. ....................... | 364/200 |
| 5,047,925 | 9/1991 | Kun et al. ................................. | 364/200 |
| 5,075,845 | 12/1991 | Lai et al. .................................. | 395/425 |
| 5,093,914 | 3/1992 | Coplien et al. .......................... | 395/700 |
| 5,095,480 | 3/1992 | Fenner ...................................... | 370/94.1 |
| 5,111,413 | 5/1992 | Lazansky et al. ....................... | 364/578 |
| 5,136,712 | 8/1992 | Perazzoli, Jr. et al. ................. | 395/700 |
| 5,161,225 | 11/1992 | Abraham et al. ....................... | 395/600 |
| 5,163,148 | 11/1992 | Walls ......................................... | 395/600 |
| 5,185,885 | 2/1993 | Dysart et al. ............................ | 395/600 |
| 5,261,052 | 11/1993 | Shimamoto et al. ................... | 395/200 |
| 5,265,221 | 11/1993 | Miller ........................................ | 395/725 |
| 5,276,872 | 1/1994 | Lomet et al. ............................. | 395/600 |
| 5,280,610 | 1/1994 | Travis, Jr. et al. ...................... | 395/600 |
| 5,283,830 | 2/1994 | Hinsley et al. .......................... | 380/25 |
| 5,287,453 | 2/1994 | Roberts .................................... | 395/200 |
| 5,291,283 | 3/1994 | Kondo et al. ............................ | 348/390 |
| 5,291,583 | 3/1994 | Bapat ........................................ | 395/614 |
| 5,295,256 | 3/1994 | Bapat ........................................ | 395/500 |
| 5,297,279 | 3/1994 | Bannon et al. .......................... | 395/600 |
| 5,297,283 | 3/1994 | Kelly, Jr. et al. ........................ | 395/650 |
| 5,301,286 | 4/1994 | Rajani ....................................... | 395/400 |
| 5,301,316 | 4/1994 | Hamilton et al. ....................... | 395/600 |
| 5,303,375 | 4/1994 | Collins et al. ........................... | 395/650 |
| 5,315,709 | 5/1994 | Alston et al. ............................ | 707/103 |

(List continued on next page.)

OTHER PUBLICATIONS

Fishman, D. H., "An overview of the Iris Oject–Oreinted DBMS", COPCOM, Apr. 1988.

*Primary Examiner*—Thomas G. Black
*Assistant Examiner*—Jean H. Corrielus
*Attorney, Agent, or Firm*—Mark S. Walker; Jenkins & Gilchrist; George E. Clark

[57] ABSTRACT

A method for building an objectbase of persistent objects, includes naming an objectbase collection of objects, naming each object relative to a first collection of objects using a first key, assigning, to each new object to be added to the objectbase collection, a second key, generating a third key from the first and second keys, storing each object with the associated keys generating a reference to each object in the objectbase collection from the third key and one or more system identifiers, creating an instance of an object collection in a database client, identifying a class of each object in the object collection to the instance collection, generating a stream class for persistence of element objects, identifying to the instance collection a mapping between its attributes that are persistent and the corresponding database fields, identifying to the instance collection access control information in the form of one or more predicates, and activating the element objects using the stream.

19 Claims, 3 Drawing Sheets

U.S. PATENT DOCUMENTS

| | | | |
|---|---|---|---|
| 5,321,841 | 6/1994 | East et al. | 395/725 |
| 5,325,524 | 6/1994 | Black et al. | 395/600 |
| 5,335,323 | 8/1994 | Kolnick | 395/164 |
| 5,341,478 | 8/1994 | Travis, Jr. et al. | 395/200 |
| 5,343,554 | 8/1994 | Koza et al. | 395/13 |
| 5,363,313 | 11/1994 | Lee | 364/491 |
| 5,369,702 | 11/1994 | Shanton | 380/4 |
| 5,369,778 | 11/1994 | San Soucie et al. | 395/800 |
| 5,379,432 | 1/1995 | Orton et al. | 395/700 |
| 5,404,506 | 4/1995 | Fujisawa et al. | 395/600 |
| 5,404,508 | 4/1995 | Konrad et al. | 395/600 |
| 5,404,529 | 4/1995 | Chernikoff et al. | 395/700 |
| 5,408,649 | 4/1995 | Beshears et al. | 395/575 |
| 5,412,774 | 5/1995 | Agrawal et al. | 395/157 |
| 5,414,840 | 5/1995 | Rengarajan et al. | 395/600 |
| 5,421,012 | 5/1995 | Khoyi et al. | 395/650 |
| 5,421,015 | 5/1995 | Khoyi et al. | 395/650 |
| 5,437,027 | 7/1995 | Bannon et al. | 395/600 |
| 5,499,365 | 3/1996 | Anderson et al. | 395/600 |
| 5,499,371 | 3/1996 | Henninger et al. | 395/700 |
| 5,615,362 | 3/1997 | Jensen et al. | 395/614 |

METHOD FOR CREATING AN OBJECT BASE OF PERSISENT APPLICATION OBJECTS IN AN OBJECT ORIENTED PROGRAMMING ENVIRONMENT AND APPARATUS RELATED THERETO

BACKGROUND OF THE INVENTION

1. Technical Field of the Invention

The present invention relates to information handling systems, methods and articles of manufacture, and more particularly to information handling systems, methods and articles of manufacture including an objectbase of persistent application objects.

2. Background of the Invention

Although object modeling has many customer advantages over data modeling, the objects world has much to learn from the data world with respect to how large numbers of entities are managed.

Objects allow the following significant improvements for end users:

- Objects allow applications to be built from off-the-shelf binary objects (for example OpenDoc parts) which can significantly reduce development cost (by a factor of 10 or more) and time to market.
- Objects allow a much more direct model of an enterprise's entities and policy constraints.
- Objects allow skinny client machines that only support a distributed Object Request Broker (ORB) for all client-server activity.

Databases are the only kind of computer system that has successfully dealt with managing very large (e.g., 10**9) numbers of things (collections of records).

3. Prior Art

In the prior art there are many techniques for improving object oriented programming systems (OOPS).

The following are examples of the prior art.

U.S. Pat. No. 5,093,914 generally teaches a method used by a digital computer in controlling execution of an object oriented program to effect a defined action, for example, stopping the program when a specified virtual function is invoked on a specified object during execution of the program.

Although the patent generally deals with methods for controlling execution of object oriented programs, the patent does not teach nor suggest construction of an objectbase of persistent application objects as is taught and claimed herein with reference with the present invention.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patent deals generally with the use of object oriented systems including classes and sub-classes for solving problems, the patent does not teach nor suggest construction of an objectbase of persistent application objects as is taught and claimed herein with reference with the present invention.

The best of both worlds can be achieved if the objects world learns several crucial lessons from the experiences found in the data world.

SUMMARY OF THE INVENTION

Therefore, it is an object of the present invention to construct and use an objectbase of persistent application objects in an object oriented information handling system.

Accordingly, a system, method and article of manufacture include one or more processors, a storage system, a system bus, a display sub-system, for displaying information, a cursor control device, an I/O subsystem, an operating system program, and an object base containing one or more persistent application objects.

DETAILED DESCRIPTION OF A PREFERRED EMBODIMENT OF THE INVENTION

Figure 1:
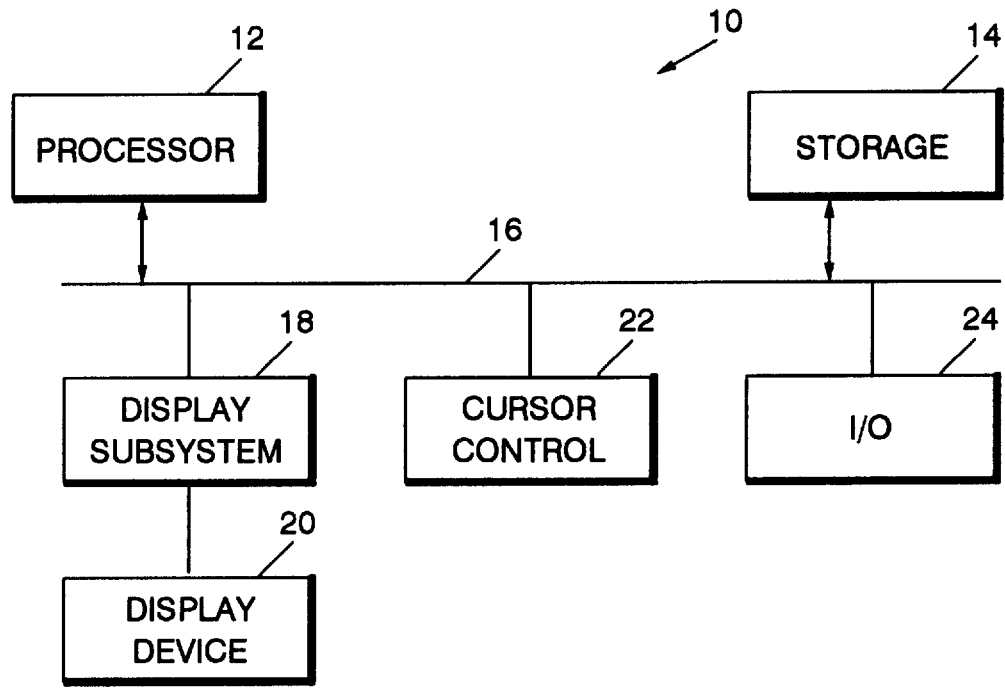
FIG. 1 is a block diagram of a system for executing the method according to the present invention.

In the prior art data world, a database record collection (e.g., an SQL table) serves as a home for the computer model of the enterprise entities. That is, presence of the entity's record in the home table implies its existence in the enterprise. For example, if the employee record is in the EMPLOYEE table, then the employee works for the enterprise, and if the employee record is not in the EMPLOYEE table, then the employee does not work for the enterprise.

These record collections are named (e.g., the EMPLOYEE table), and the records are named relative to their home collection via a primary key (e.g., a social security number). This compound name serves as both a user name and as the identity of the record. This mechanism is much more practical than having a flat name or identity space for all records.

These record collections are instance managers (IM) or ORBs for the records. That is, a user asks the record collection to:

Create a new record to add to its collection.

Either find or bring into memory an existing record in its collection given its primary key.

Destroy an existing record from its collection.

For a particular application, a query language can be used to define a subset collection of a home record collection:

A subset of one of these home record collections via a predicate.

A subset of the fields of these home records via an enumerated list.

Such a subset record collection is defined via the home collection plus a predicate and a list of the fields. To get at this subset of records one at a time, an iterator is associated with the query. For example, the subset collection of all employee records whose office is on the second floor can be defined as an iterator which can be iterated through in an application. Using embedded SQL, a C program might be as follows:

```
EXEC SQL DECLARE cl CURSOR FOR
    SELECT NAME, BIRTHYEAR    // the subset of fields
    FROM EMPLOYEE             // the table
    WHERE OFFICEFLOOR = 2;    // the predicate
...
EXEC SQL FETCH cl
    INTO :ename, :ebirthyear;
...
```

Databases support concurrent access to records by different users. Their concurrency control offers some flexibility in locking. One dimension of flexibility is when locks are obtained:

On-demand locking: Locks are automatically obtained on behalf of the user's current transaction context on records as they are accessed. This is the typical default.

Early locking: A user can lock records earlier than the records are accessed.

Another dimension of flexibility is when locks are released, called the isolation level which can be chosen for each iterator (i.e., cursor):

Two-phase locking: This automatically gets locks on behalf of the user's current transaction context on records as they are accessed and holds these locks until the end of the transaction. This guarantees serializability of concurrent transactions regardless of the application semantics. This is the typical default.

Cursor stability: This automatically gets locks on behalf of the user's current transaction context on records as they are accessed and holds these locks while a cursor is currently on the record and, if the record is updated, until the end of the transaction. This can greatly reduce lock contention. It is up to the application to determine whether this weaker isolation level is acceptable.

Dirty read: This is only used by read-only applications. Locks are not held on records. While data is being read, access to the physical page is serialized.

For security, a subset collection can be associated with a user or user group. The subset predicate is ANDed with the application-specific predicate to restrict which records are accessed. To further restrict the user to a subset of the record fields, the list of field names are also included. This list is also checked during an application-specific query. This predicate-based approach to access control is much more reasonable than either enumerating the element record keys for each user or user group, or attaching an ACL to each record. It typically increases query performance because:

When an index exists on part the access control predicate, performance is improved by orders of magnitude.

Even when an index does not exist on part the access control predicate, checking the predicate against each record is much faster than checking record membership in a record access control group.

These home record collections (the database) are kept in a reliable and physically secure server. The applications can either run in the server machine or in a separate client machine. In either case, the address space accessing the data is separate from the address space running user-written application code. These applications process only cache records.

Figure 2:
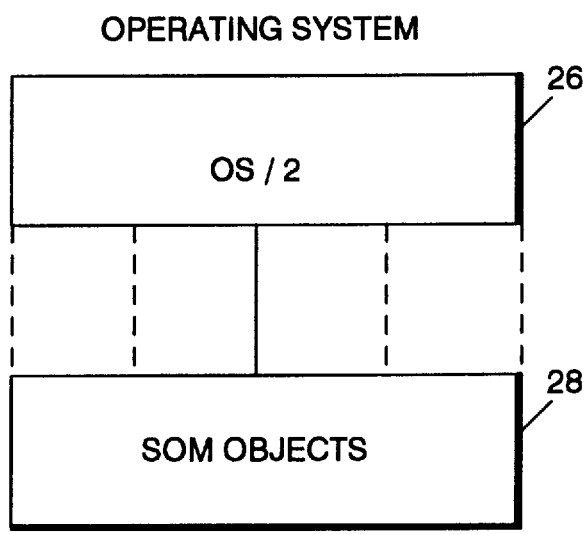
FIG. 2 is a block diagram showing the operating system platform and system object model program supporting the present invention.

Referring now to FIGS. 1 and 2, on information handling system 10 and an operating system environment for the present invention will be described.

Information handling system 10 may be a graphics work station or the like with a powerful processor 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multi-tasking operating system such as OS/2* (OS/2 is a registered trademark of International Business Machines Corporation). Among many tasks which the OS/2 operating system controls an operating information handling system 10, is execution of a program SOMObjects, which is a commercially available product of International Business Machines Corporation.

The method and article of manufacture of the present invention may be incorporated in the SOMObjects program. Description of An Objectbase According to the Present Invention In the object world, an objectbase collection serves as a home for the computer model of the enterprise entities. That is, presence of the entity's object in the objectbase collection implies its existence in the enterprise. For example, if the employee object is in the employee collection, then the employee works for the enterprise, and if the employee object is not in the employee collection, then the employee does not work for the enterprise.

Figure 4:
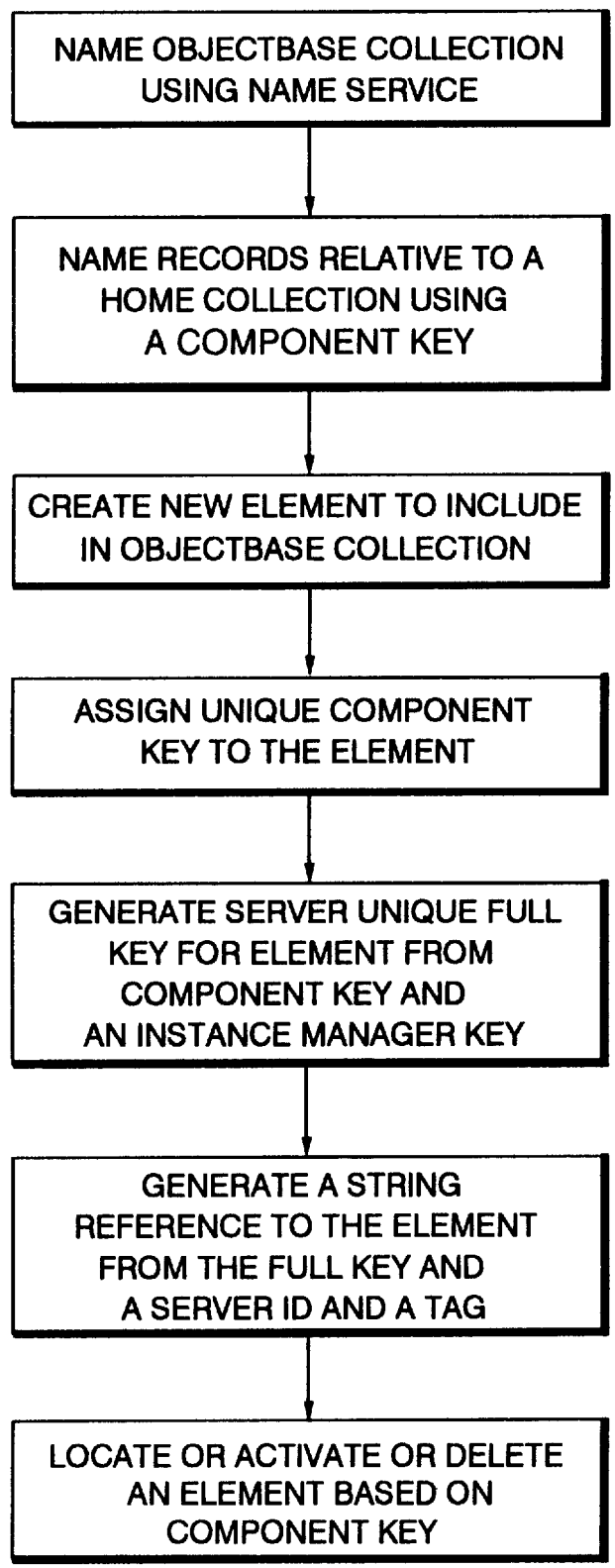
FIG. 4 is a flow chart of a naming process for objects in an object base in accordance with the present invention.

These objectbase collections are named using the Name Service (see FIG. 4). For example, an Acme Corp. user might have a machine root NamingContext (an object directory) containing the name "employees" bound to the objectbase collection containing all employees. The records are named relative to their home collection via a primary key (e.g., a social security number), so a user can ask the collection to find an employee with a given key. This mechanism is much more practical than having a flat name space for all objects.

Each of these objectbase collections is either an object instance manager or an ORB for its element objects. As one of these, it is responsible for the following:

A user asks the objectbase collection to create a new element to include in the collection.

It provides an element object's component key that is unique within that instance manager. An objectbase collection instance manager would use the database record key for this. This component key is used in generating the full key that is unique within the server by adding the instance manager's key. This full key is used in generating the full stringified reference that is made globally unique by adding the server id and a tag. Exploiting the database record identity (i.e., the record's key) prevents the instance manager from having to persistently store something else for each object to support object identity.

Given the component key, it either finds (if cached in memory) or activates (if not cached in memory) the element object.

A user asks the objectbase collection to destroy an existing element in the collection.

For a particular application, a query language can be used to define a subset collection of an objectbase collection:

A subset of one of these home record collections via a predicate.

Such a subset object collection is defined via the home collection plus a predicate. To get at this subset of objects one at a time, an iterator is associated with the query. For example, the subset collection of all employee objects whose office is on the second floor can be defined as an iterator which can be iterated through in an application.

Using SQL for the query predicate, a C++ program might be as follows:

```
query_mgr = root_directory-> resolve("acme_query_manager");
query_mgr-> query(
    "SELECT *                  // get whole objects
    FROM employees             // the collection
    WHERE office_floor = 2",   // the predicate
    iterator);                 // OUT iterator
...
an_emp = iterator-> get_next();
...
```

An objectbase should support levels of isolation that correspond to the underlying database system. For each query, the isolation level is specified. The corresponding iterator behaves accordingly.

For security, a subset collection can be associated with a user or user group. The subset predicate is ANDed with the application-specific predicate to restrict which element objects are accessed. To further restrict the user to a subset of the methods, the list of method names are also included. This list is also checked during an application-specific query.

These objectbase collections (the objectbase) are kept in a reliable and physically secure server in a database client address space. An application includes both these objectbase collections and their clients, which may also be objects. The clients can either run in the server machine or in a separate client machine. Typically, the clients run in a separate address space from the objectbase, so security and integrity can be enforced. These application processes can either cache the objectbase objects or forward operations to the objectbase machine.

Figure 3:
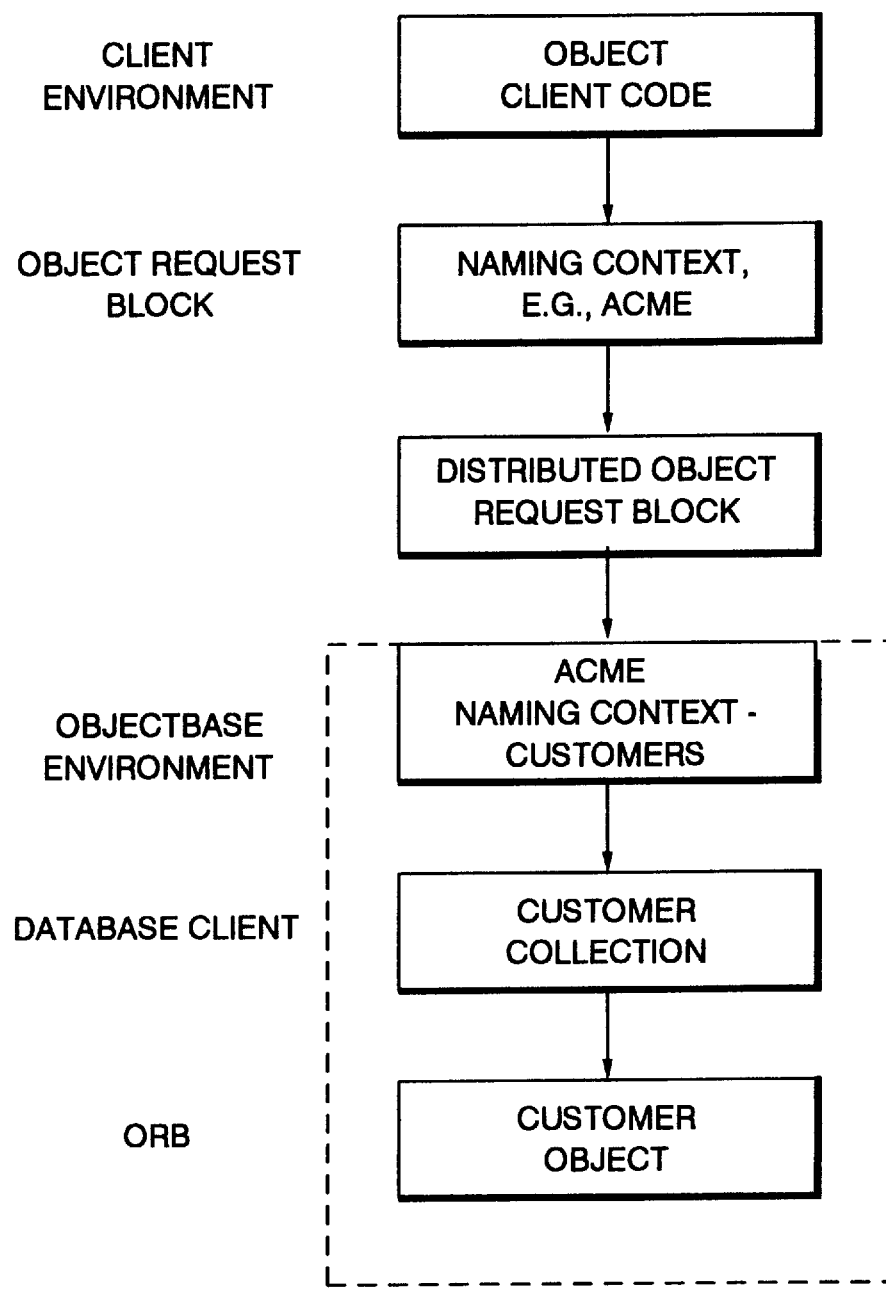
FIG. 3 illustrates an objectbase environment according to the present invention.

FIG. 3 illustrates an objectbase environment according to the present invention.

Collection Class Products

A collection class product should be supplied for each database system application program interface (API).

The customer of one of these objectbase collection classes does the following to make a new instance collection:

1) Makes an instance of this collection in a database client.
2) Tells the instance collection what class its elements objects have.
3) Tells the instance collection what Stream class to use for persistence of its element objects. This Stream class might be generated via the DAX GUI tools for schema mapping between the database schema and the element class's externalize schema.
4) Tells the instance collection the mapping between its attributes that are persistent and the corresponding database fields, so that queries can be efficiently supported via database indexes.
5) Tells the instance collection access control information in the form of predicates.

An implementation of a collection class that is the same for all database system APIs does the following:

It has a cache manager of a fixed small number of objects. This includes a fixed number of objects preallocated, a hash table to find objects in the cache based on the database key, and an least recently used (LRU) algorithm to find a cache victim.

It activates the objects using the provided Stream. This reuses already allocated memory found via the LRU algorithm. It initializes the object, sets the record key in its Stream object that includes the schema mapping, and tells the object to internalize itself from the Stream.

An implementation of the collection class that is unique for each database system API does the following:

It ensures that a connection exists with the database containing the correct record collection.

For a query on the collection to find the qualifying element objects, the collection translates any part of the predicate onto a database query that filters records. The remaining records are activated and the remainder of the predicate produces an iterator with the final results.

During activation, it ANDs the correct access control predicate with the query predicate.

Overhead is reduced, because the collection and its elements are in the database client, and the collection knows the correct database and does the database connect.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A method for building an objectbase of persistent objects, comprising the steps of:

binding an objectbase name to a persistent collection of objects;

associating a component key with each new object to be added to the persistent collection of objects, said component key being unique within said persistent collection;

generating for each new object a full key unique within a server containing said persistent collection from the component key and said objectbase name; and storing said new object and component key.

2. A method according to claim 1, wherein said generating step further comprises the step of:

generating a globally unique reference to an object in the persistent collection of objects from the full key and one or more server identifiers.

3. A method according to claim 2, wherein the server identifiers comprise a server ID and a tag.

4. A method according to claim 1, further comprising the steps of:

storing said persistent collection of objects as an instance collection in a database having a plurality of database fields;

identifying a class of the objects in the persistent collection of objects to the instance collection.

5. A method according to claim 4, further comprising the step of:

assigning a stream class to said instance collection to use for persistence of element objects.

6. A method according to claim 5, further comprising the step of:

activating the element objects using the stream class.

7. A method according to claim 6, wherein the step of activating further comprises the steps of:

initializing the element objects;

providing a component key for said object to said stream object; and instructing each element object to internalize itself from the stream.

8. A method according to claim 4, further comprising the step of:

identifying to the instance collection a mapping between its attributes that are persistent and said plurality of database fields.

9. A method according to claim 4, further comprising the step of:

identifying to the instance collection access control information in the form of one or more predicates.

10. A method according to claim 1, wherein the objectbase further comprises a home collection of previously added objects to which the new objects are added.

11. A computer readable medium, comprising:

computer program product means for causing a computer system to bind an objectbase name to a persistent collection of objects;

computer program product means for causing a computer system to associate a component key with each new object to be added to the persistent collection of objects, said component key being unique within said persistent collection;

computer program product means for causing a computer system to generate for each new object a full key unique within a server from the component key and said objectbase name; and computer program product means for causing a computer system to store said new object and said component key.

12. A computer readable medium, according to claim 11, further comprising:

computer program product means for causing a computer system to generate a globally unique reference to each new object in the persistent collection of objects from the full key and one or more server identifiers.

13. A computer readable medium, according to claim 12, wherein the server identifiers comprise a server ID and a tag.

14. A computer readable medium, according to claim 11, further comprising:

computer program product means for causing a computer system to store said persistent collection of objects as an instance collection in a database having a plurality of database fields;

computer program product means for causing a computer system to identify a class of object in the persistent collection of objects to the instance collection.

15. A computer readable medium, according to claim 14, further comprising:

computer program product means for causing a computer system to assign a stream class to said instance collection to use for persistence of element objects.

16. A computer readable medium, according to claim 11, further comprising:

computer program product means for causing a computer system to present a subset of said persistent collection in response to a predicate defining a property of said subset collection.

17. An information handling system, comprising:

processor means for processing computer readable instructions;

storage means for storing data and instructions;

an operating system program; and an objectbase containing one or more persistent objects, the objectbase comprising:

means for binding an objectbase name to said objectbase;

means for associating a component key with each new object to be added to the persistent collection of objects, said component key being unique within said persistent collection;

means for generating for each new object a full key unique within a server containing said persistent collection from the component key and said objectbase name; and means for storing said new object and component key.

18. An information handling system, according to claim 17, further comprising:

a cache manager for controlling storing a fixed small number of objects in a cache.

19. An information handling system, according to claim 17, wherein said cache contains one or more preallocated objects, and said information handling system further comprises:

a hash table to find objects in the cache based on a first key; and means for finding a cached object to be replaced by a next stored object when said cache is full.

* * * * *

UNITED STATES PATENT AND TRADEMARK OFFICE
CERTIFICATE OF CORRECTION

PATENT NO. : 5,809,506
DATED : Sep. 15, 1998
INVENTOR(S) : Copeland

It is certified that error appears in the above-identified patent and that said Letters Patent is hereby corrected as shown below:

On the title page, item [54] and column 1, line 2, "PERSISENT" should read --PERSISTENT--.

In the Abstract, delete the present abstract and add the following abstract:
--The invention is a method for creating an objectbase of persistent application objects and apparatus related thereto. The method and apparatus are used in an object oriented programming environment. The invention adds objects to an objectbase by combining a component key and an instance manager key to generate a full key. The object there is stored together with its component key and its full key.--

Signed and Sealed this

Sixteenth Day of February, 1999

Attest:

*Attesting Officer*

*Acting Commissioner of Patents and Trademarks*